US010002442B1

(12) United States Patent
Dagley et al.

(10) Patent No.: US 10,002,442 B1
(45) Date of Patent: Jun. 19, 2018

(54) PLACEMENT OF AUGMENTED REALITY OBJECTS USING A GUIDE MARKER

(71) Applicant: Capital One Services, LLC, McLean, VA (US)

(72) Inventors: Geoffrey Dagley, McKinney, TX (US); Jason Hoover, Grapevine, TX (US); Qiaochu Tang, The Colony, TX (US); Stephen Wylie, Carrollton, TX (US); Sunil Vasisht, Flower Mound, TX (US); Micah Price, Anna, TX (US)

(73) Assignee: Capital One Services, LLC, McLean, VA (US)

( * ) Notice: Subject to any disclaimer, the term of this patent is extended or adjusted under 35 U.S.C. 154(b) by 0 days. days.

(21) Appl. No.: 15/850,387

(22) Filed: Dec. 21, 2017

(51) Int. Cl.
  *G06T 7/73* (2017.01)
  *G06T 11/60* (2006.01)

(52) U.S. Cl.
  CPC ............... *G06T 7/73* (2017.01); *G06T 11/60* (2013.01); *G06T 2207/30204* (2013.01)

(58) Field of Classification Search
  None
  See application file for complete search history.

(56) References Cited

U.S. PATENT DOCUMENTS

| | | | |
|---|---|---|---|
| 2003/0117398 A1* | 6/2003 | Hubrecht | G06T 15/40 345/423 |
| 2009/0027385 A1* | 1/2009 | Smith | G06T 13/20 345/420 |
| 2011/0317880 A1* | 12/2011 | Pettersson | G01B 11/005 382/106 |
| 2014/0210856 A1* | 7/2014 | Finn | G01C 15/002 345/633 |
| 2015/0062120 A1* | 3/2015 | Reisner-Kollmann | G06T 19/006 345/419 |
| 2015/0097865 A1* | 4/2015 | Subramanian | G06T 19/006 345/633 |
| 2015/0130790 A1* | 5/2015 | Vasquez, II | G06T 19/006 345/419 |

(Continued)

OTHER PUBLICATIONS

Human Interface Guidelines, "Augmented Reality", https://developer.apple.com/ios/human-interface-guidelines/technologies/augmented-reality/#placing-virtual-objects, 2017, 9 pages.

(Continued)

*Primary Examiner* — James A Thompson
(74) *Attorney, Agent, or Firm* — Harrity & Harrity, LLP

(57) ABSTRACT

In some implementations, a system may include a camera, a display, one or more memories, and one or more processors communicatively coupled to the one or more memories. The system may output a guide marker for presentation on the display. The guide marker may be superimposed on an image being captured by the camera and presented on the display. The system may determine three-dimensional (3D) coordinates of an intersection point associated with the guide marker. The intersection point may be a point where a projection of the guide marker into 3D space intersects with a horizontal plane identified in the image. The system may determine two-dimensional (2D) coordinates for presentation of an augmented reality object on the display based on the 3D coordinates of the intersection point. The system may superimpose a representation of the augmented reality object on the image based on the 2D coordinates.

20 Claims, 6 Drawing Sheets

(56) References Cited

U.S. PATENT DOCUMENTS

| | | | | |
|---|---|---|---|---|
| 2016/0189426 A1* | 6/2016 | Thomas | ............... | G06T 19/006 |
| | | | | 345/633 |
| 2016/0292918 A1* | 10/2016 | Cummings | .......... | H04N 5/2252 |
| 2017/0329480 A1* | 11/2017 | Ishikawa | ............... | G06F 3/0484 |
| 2017/0329488 A1* | 11/2017 | Welker | ............... | G06F 3/04815 |

OTHER PUBLICATIONS

Mark Dawson, "ARKit by Example—Part2:Plane Detection + Visualization", https://blog.markdaws.net/arkit-by-example-part-2-plane-detection-visualization-10f05876d53, Jun. 11, 2017, 12 pages.

Apple Developer, "Building Your First AR Experience", https://developer.apple.com/documentation/arkit/building_your_first_ar_experience, 2017, 3 pages.

Tango, "Unity How-to Guide: Placing Virtual Objects in Augmented Reality", https://developers.google.com/tango/apis/unity/unity-howto-placing-objects, May 10, 2017, 5 pages.

\* cited by examiner

PLACEMENT OF AUGMENTED REALITY OBJECTS USING A GUIDE MARKER

BACKGROUND

Augmented reality (AR) may refer to a live view of a physical, real-world environment that is modified by a computing device to enhance an individual's current perception of reality. In augmented reality, elements of the real-world environment are "augmented" by computer-generated or extracted input, such as sound, video, graphics, haptics, global positioning system (GPS) data, and/or the like. Augmented reality may be used to enhance and/or enrich the individual's experience with the real-world environment.

SUMMARY

According to some possible implementations, a system may include a camera, a display, one or more memories, and one or more processors communicatively coupled to the one or more memories. The system may output a guide marker for presentation on the display. The guide marker may be superimposed on an image being captured by the camera and presented on the display. The system may determine three-dimensional (3D) coordinates of an intersection point associated with the guide marker. The intersection point may be a point where a projection of the guide marker into 3D space intersects with a horizontal plane identified in the image. The system may determine two-dimensional (2D) coordinates for presentation of an augmented reality object on the display based on the 3D coordinates of the intersection point. The system may superimpose a representation of the augmented reality object on the image based on the 2D coordinates.

According to some possible implementations, a method may include outputting, by a device, a guide marker for presentation on a display of the device. The guide marker may be superimposed on an image being captured by the device and presented on the display of the device. The method may include determining, by the device, three-dimensional (3D) coordinates of an intersection point associated with the guide marker. The intersection point may be a point where a projection of the guide marker into 3D space intersects with a horizontal plane identified in the image. The method may include determining, by the device, two-dimensional (2D) coordinates for presentation of an augmented reality object on the display of the device based on the 3D coordinates of the intersection point. The method may include superimposing, by the device, a representation of the augmented reality object on the image based on the 2D coordinates.

According to some possible implementations, a non-transitory computer-readable medium may store one or more instructions that, when executed by one or more processors of a device, cause the one or more processors to output a guide marker for presentation on a display of the device. The guide marker may be superimposed on an image being captured by the device and presented on the display. The one or more instructions may cause the one or more processors to determine three-dimensional (3D) coordinates of an intersection point associated with the guide marker. The intersection point may be a point where a projection of at least a portion of the guide marker into 3D space intersects with a horizontal plane identified in the image. The one or more instructions may cause the one or more processors to determine two-dimensional (2D) coordinates for presentation of an augmented reality object on the display based on the 3D coordinates of the intersection point. The one or more instructions may cause the one or more processors to superimpose a representation of the augmented reality object on the image based on the 2D coordinates.

DETAILED DESCRIPTION

Figure 1A:
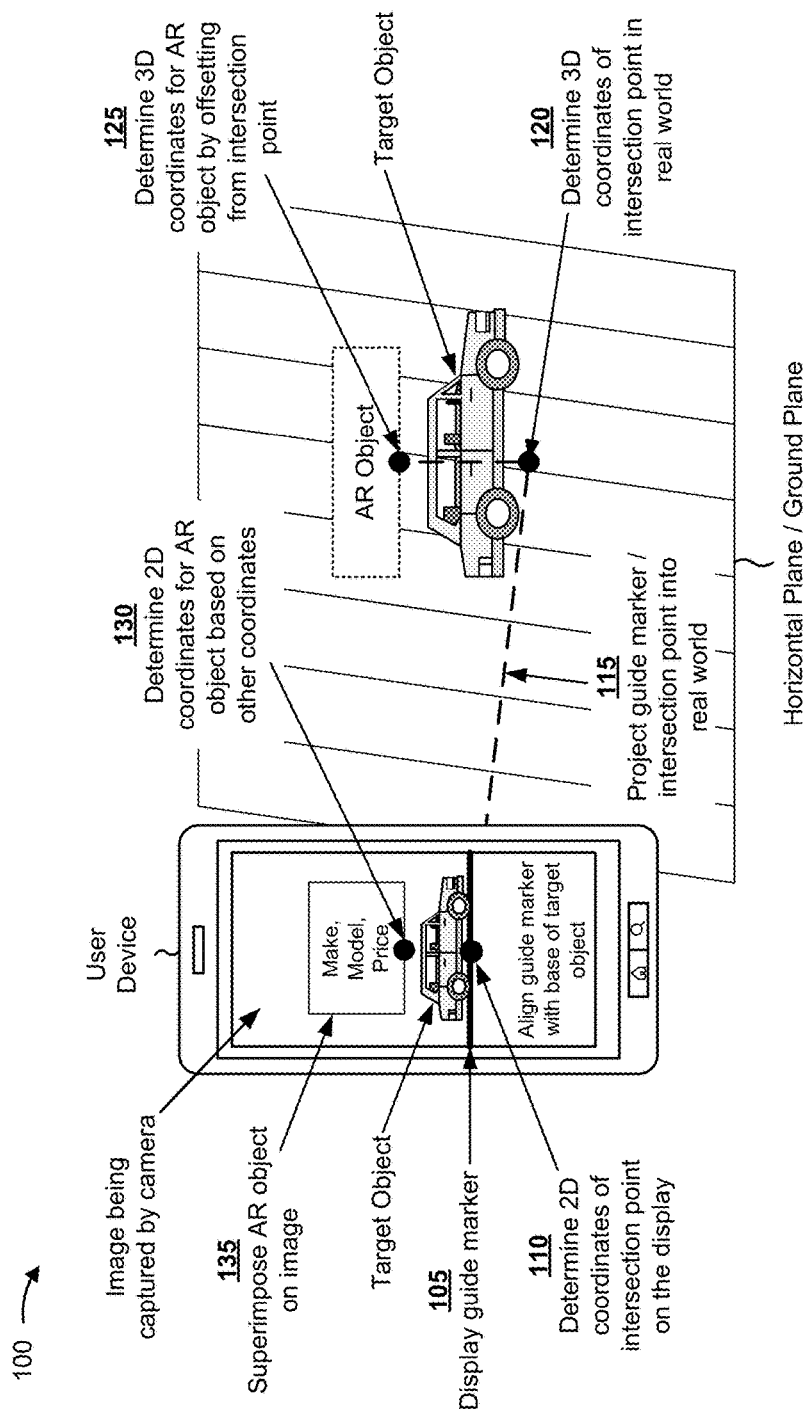
FIGS. 1A and 1B are diagrams of an overview of an example implementation described herein.

The following detailed description of example implementations refers to the accompanying drawings. The same reference numbers in different drawings may identify the same or similar elements.

Augmented reality may be used to superimpose virtual objects (sometimes referred to as augmented reality objects herein) on a display of an image of an environment that is being captured (e.g., in real time). For example, a user of a user device (e.g., a smartphone, a tablet, smart glasses, and/or the like) may use a camera of the user device to capture video of the user's surroundings, and the user device (e.g., executing an augmented reality application running on the user device) may superimpose a representation of an object (e.g., an augmented reality object) on the image being captured by the user device. To properly place the augmented reality object on the display relative to an object in the image, the user device could identify a horizontal plane and a vertical plane within the real world environment that is captured by the user device, and place the augmented reality object relative to the horizontal plane and the vertical plane. Some tools may be capable of identifying horizontal planes that occur within an environment, but may not be capable of identifying vertical planes within the environment. As a result, placing an augmented reality object in an image relative to (e.g., appearing directly above, a certain distance above, etc.) a target object and/or a horizontal plane may be difficult. Some implementations described herein permit proper placement of an augmented reality object in an image relative to a target object without needing to identify a vertical plane.

Some implementations described herein permit a user device to display a guide marker (e.g., a guideline, a bounding shape, and/or the like) on an image, such that a user can align a target object with the guide marker (e.g., by pointing a smartphone camera at the target object until the target object aligns with the guide marker) and using the alignment to determine coordinates for superimposing an augmented reality object in the image. For example, the user device may display a guide marker superimposed on an image being captured by the user device and presented on the display of the device, and may determine 3D coordinates of an intersection point where a projection of the guide marker into 3D space intersects with a horizontal plane (e.g., a ground plane) identified in the image. Based on the 3D coordinates of the intersection point, the user device may determine two-dimensional (2D) coordinates for presentation of an augmented reality object on the display of the device, and may superimpose a representation of the augmented reality object on the image based on the 2D coordinates.

In this way, implementations described herein provide for effective and accurate placement of augmented reality objects in an image displayed by a user device (e.g., a smartphone). For example, implementations described herein provide for automatic placement and/or alignment of an augmented reality object relative to a target object (e.g., above a target object, a particular distance above the target object, and/or the like), thereby ensuring and/or enhancing the usefulness of the augmented reality object to the user, and obviating manual and/or further attempts to position the user device to accomplish a desired result, thereby conserving processing resources, power (e.g., battery life), and/or the like of the user device.

Figure 1B:
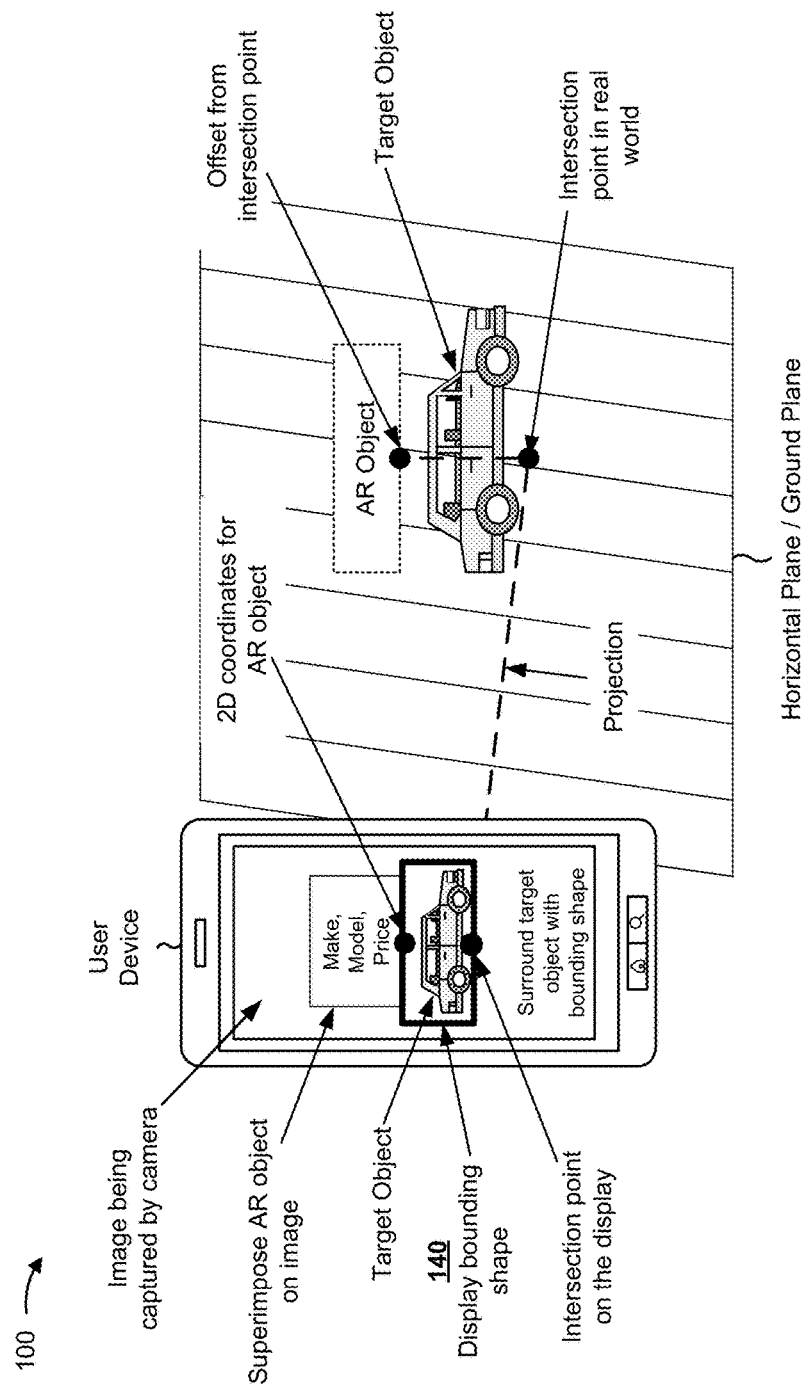

As shown in FIGS. 1A-1B, example implementation 100 may include a user device (e.g., a smartphone running an augmented reality application) which may capture an image (e.g., of the real world environment of the user device) on which the user device may superimpose an augmented reality object.

As shown in FIG. 1A, and by reference number 105, the user device may display a guide marker. In some implementations, the guide marker may be a guideline, as shown. For example, the guide marker may be a horizontal line to be positioned at a base (e.g., a bottom, a lowest point, a point that rests on the ground, etc.) of the target object, where the target object intersects and/or rests on a horizontal plane (e.g., a ground plane).

In some implementations, the user device may be a smartphone, and the smartphone may display the guide marker on a display of the smartphone, superimposed on an image being captured by a camera of the smartphone. In some implementations, a user of the smartphone may point the camera at a target object, and the smartphone may display the guide marker on an image of the target object being captured via the camera.

In some implementations, the user may move the user device (e.g., in response to a prompt by the user device) until the guide marker is aligned with the base of the target object (e.g., a point where the target object rests on or intersects with a horizontal plane, such as a ground plane). In some implementations, the user may provide input to the user device indicating that the guide marker is aligned with the base of the target object. In some implementations, the user device may automatically align the guide marker with the base of the target object, and may output an indication that the guide marker is aligned with the target object. In this case, the user may provide input confirming that the guide marker is aligned with the base of the target object. In some implementations, the user may interact with the user device to draw the guide marker (e.g., by dragging the user's finger across the display of the user device), and the user device may interpret the drawn guide marker.

As further shown in FIG. 1A, and by reference number 110, the user device may determine 2D coordinates of an intersection point on the display. The intersection point may be a point on the guide marker. For example, where the guide marker is a guideline, as shown, the user device may determine the 2D coordinates based on a midpoint of the guideline. In some implementations, the intersection point may be a point other than the midpoint of the guideline, such as a point on the guideline that corresponds to an estimated horizontal midpoint of the target object, a point on the guideline that corresponds to the midpoint on the display (e.g., that is equal distance from both vertical edges of the display), a point on the guideline selected by the user based on user input (e.g., tapping or touching the guideline), or any other point on the guideline.

As further shown in FIG. 1A, and by reference number 115, the user device may project the guide marker and/or the intersection point into 3D space (e.g., of a real world environment that is being captured by the user device, that includes the target object, etc.) to identify an intersection point in the real world that corresponds to the intersection point on the display. For example, the user device may identify a horizontal plane (e.g., a ground plane) in the 3D space, and may determine an intersection point where the projection of the guide marker intersects with the horizontal plane in the real world environment.

As shown by reference number 120, the user device may determine 3D coordinates of the intersection point of the projection of the guide marker with the horizontal plane in the real world environment. For example, the 3D coordinates may include an x coordinate, a y coordinate, and a z coordinate, one or more of which may be determined based on an estimated distance from the real world intersection point and/or the target object to the user device.

As shown by reference number 125, the user device may determine 3D coordinates for the augmented reality object based on an offset from the intersection point. For example, and as shown, the augmented reality object may be placed above the target object, and the offset may be used to place the augmented reality object at a particular height relative to the horizontal plane. In this case, the 3D coordinates may be determined by keeping an x coordinate and a y coordinate of the real world intersection point the same, and adding the offset to the z coordinate to adjust a height of the augmented reality object relative to the horizontal plane and/or the target object. In some implementations, the augmented reality object may be placed to the left of, to the right of, below, on top of, etc. the target object, and the 3D coordinates may be determined accordingly. In some implementations, the offset may be determined by processing the image to determine a height of the target object, by performing object recognition to determine one or more characteristics of the target object (e.g., a make and/or model of a vehicle) and determining a height of the target object based on the one or more characteristics, and/or the like. Additional details relating to the offset are described elsewhere herein.

As further shown in FIG. 1A, and by reference number 130, the user device may determine 2D coordinates for an augmented reality object based on other coordinates. For example, the user device may determine 2D coordinates for the augmented reality object based on the 2D coordinates of the intersection point on the display, based on the 3D coordinates of the intersection point where the projection of the guide marker intersects with the horizontal plane in the real world environment, based on the 3D coordinates determined for the augmented reality object, and/or the like. In some implementations, the user device may determine 2D coordinates for the augmented reality object using a combination of two or more of the above coordinates. Additional details relating to the coordinates are described elsewhere herein.

As shown by reference number 135, the user device may superimpose the augmented reality object on the image. For example, the user device may superimpose the augmented reality object based on the 2D coordinates for placement of the augmented reality object. In some implementations, the user device may place the augmented reality object in a location on the image based on applying an offset to 2D coordinates that represent the position of the guide marker on the display. For example, the user device may determine the offset based on comparing the 3D coordinates associated with placement of the augmented reality object and the 3D coordinates of the intersection point, based on a distance between the augmented reality object and the horizontal plane, based on a height of an object in the image (e.g., the target object), and/or the like.

As an example, the target object may be a car on a car lot (e.g., a car dealership), and the user device may superimpose an augmented reality object having information that relates to the car. For example, the augmented reality object may be an augmented reality billboard that includes information, such as the make, model, price, etc. of the car. In this case, the user device may place the augmented reality billboard in a position relative to a ground plane (e.g., a surface of the car lot) based on a height of the car.

As shown in FIG. 1B, instead of a guideline, as described above in connection with FIG. 1A, the guide marker may be a bounding shape that bounds the target object on the image. For example, the bounding shape may be a bounding box, as shown. As shown by reference number 140, the user device may display the bounding shape superimposed on the image being captured by the user device. In this case, the user may move the user device until the target object is bounded by the bounding shape, in a fashion similar to that described in FIG. 1A with respect to aligning the guide marker with the target object. Alternatively, the user device may use object recognition to identify the target object and automatically position, size, adjust, etc. the bounding shape so as to surround the target object. In some implementations, the user may draw, size, and/or resize the bounding shape so that the bounding shape properly fits around the target object, and the user device may interpret the drawn, sized, and/or resized bounding shape.

As further shown in FIG. 1B, the user device may utilize positioning of the bounding shape to place an augmented reality object in a similar manner as described above in connection with FIG. 1A. In this case, instead of using, for example, a midpoint of a guideline that borders the base of the target object, the user device may use, for example, a midpoint of a bottom boundary of the bounding shape to determine 2D coordinates of the augmented reality object.

In this way, the user device may permit effective and accurate placement of augmented reality objects in an image displayed by a user device (e.g., a smartphone). For example, the user device may permit automatic placement of an augmented reality object a particular distance above, below, on, to the left of, to the right of, etc. a target object, thereby ensuring and/or enhancing the usefulness of the augmented reality object to the user, and obviating manual and/or further attempts to position the user device to accomplish a desired result, thereby conserving processing resources, power (e.g., battery life), and/or the like of the user device.

As indicated above, FIGS. 1A and 1B are provided merely as examples. Other examples are possible and may differ from what was described with regard to FIGS. 1A and 1B.

Figure 2:
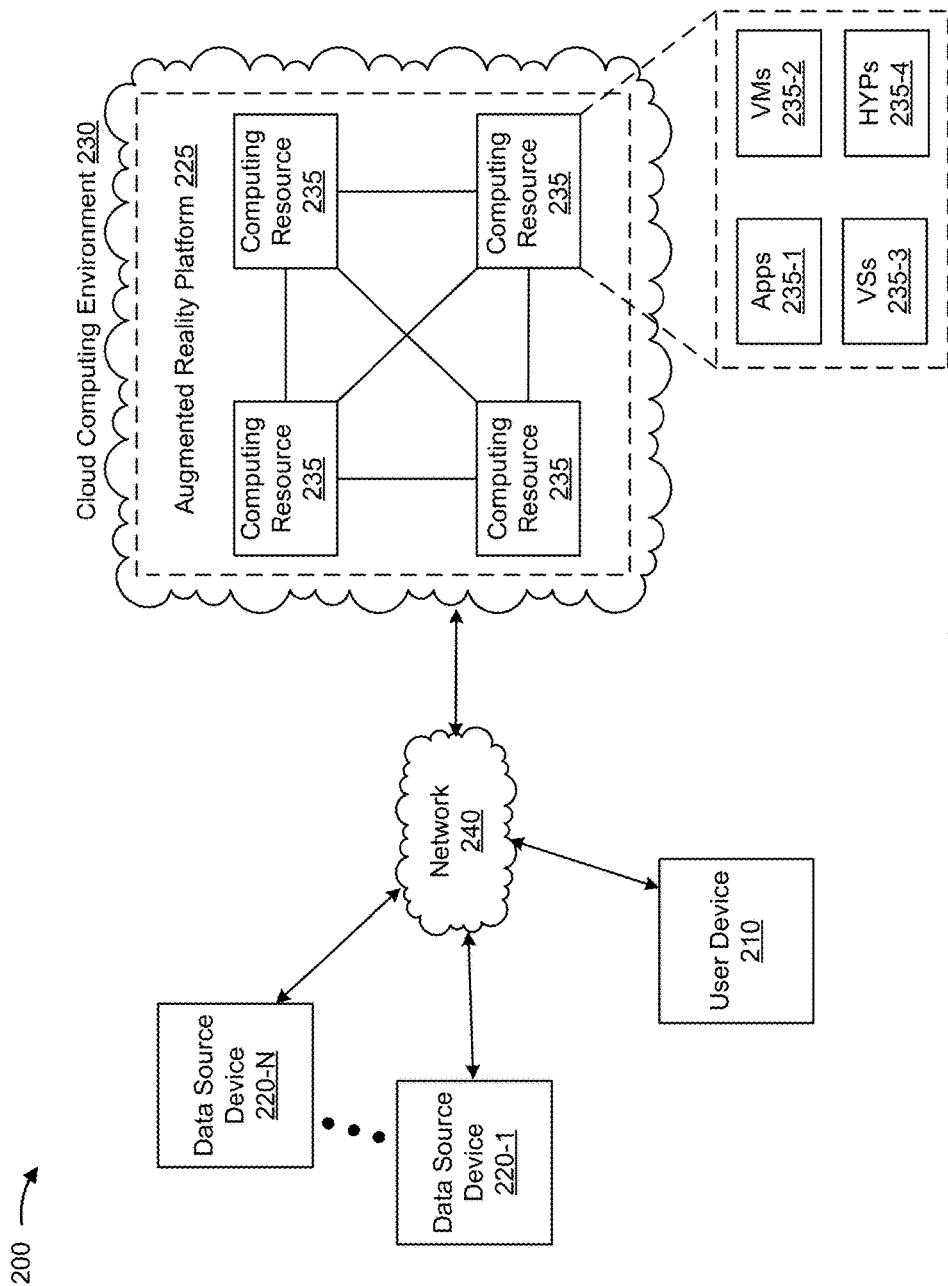
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, one or more data source devices 220-1 through 220-N (which may be referred to individually as "data source device 220" and collectively as "data source devices 220"), an augmented reality platform 225, a cloud computing environment 230 (which may include one or more computing resources 235), and a network 240. Devices of environment 200 may interconnect via wired connections, wireless connections, or a combination of wired and wireless connections.

User device 210 includes one or more devices capable of receiving, generating, storing, processing, and/or providing information associated with detecting horizontal planes in an image and/or presenting augmented reality objects. For example, user device 210 may include a communication and/or computing device, such as a mobile phone (e.g., a smartphone, a radiotelephone, and/or the like), a laptop computer, a tablet computer, a handheld computer, a gaming device, a wearable communication device (e.g., a smart wristwatch, a pair of smart eyeglasses, smart clothing, and/or the like), or a similar type of device. In some implementations, user device 210 may include an image capture component, such as a camera, a camcorder, and/or the like. Additionally, or alternatively, user device 210 may include a display.

Data source device 220 includes one or more devices capable of storing, processing, and/or routing information associated with providing an augmented reality experience. In some implementations, data source device 220 may include a server or another type of communication and/or computing device. In some implementations, data source device 220 may store information that is accessible to user device 210, and that may be used to provide an augmented reality experience on user device 210. For example, user device 210 may access information stored by data source device 220, and data source 220 may provide such information to user device 210, such that user device 210 may present such information in association with an augmented reality object presented for display by user device 210.

Augmented reality platform 225 includes one or more devices (e.g., computing resources 235) capable of providing an augmented reality experience, according to some implementations described herein.

Cloud computing environment 230 includes an environment that delivers computing as a service, whereby shared resources, services, and/or the like may be provided to user device 210. Cloud computing environment 230 may provide computation, software, data access, storage, and/or other services that do not require end-user knowledge of a physical location and configuration of a system and/or a device that delivers the services. As shown, cloud computing environment 230 may include a group of computing resources 235 (which may be referred to herein individually as computing resource 235).

Notably, while implementations described herein describe augmented reality platform 225 as being hosted in cloud computing environment 230, in some implementations, augmented reality platform 225 may not be cloud-based (i.e., may be implemented outside of a cloud computing environment) or may be partially cloud-based.

Computing resource 235 includes one or more personal computers, workstation computers, server devices, or another type of computation and/or communication device. In some implementations, computing resource 235 may host augmented reality platform 225. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 includes one or more software applications that may be provided to or accessed by user device 210. Application 235-1 may eliminate a need to install and execute the software applications on user device 210. For example, application 235-1 may include software associated with augmented reality platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
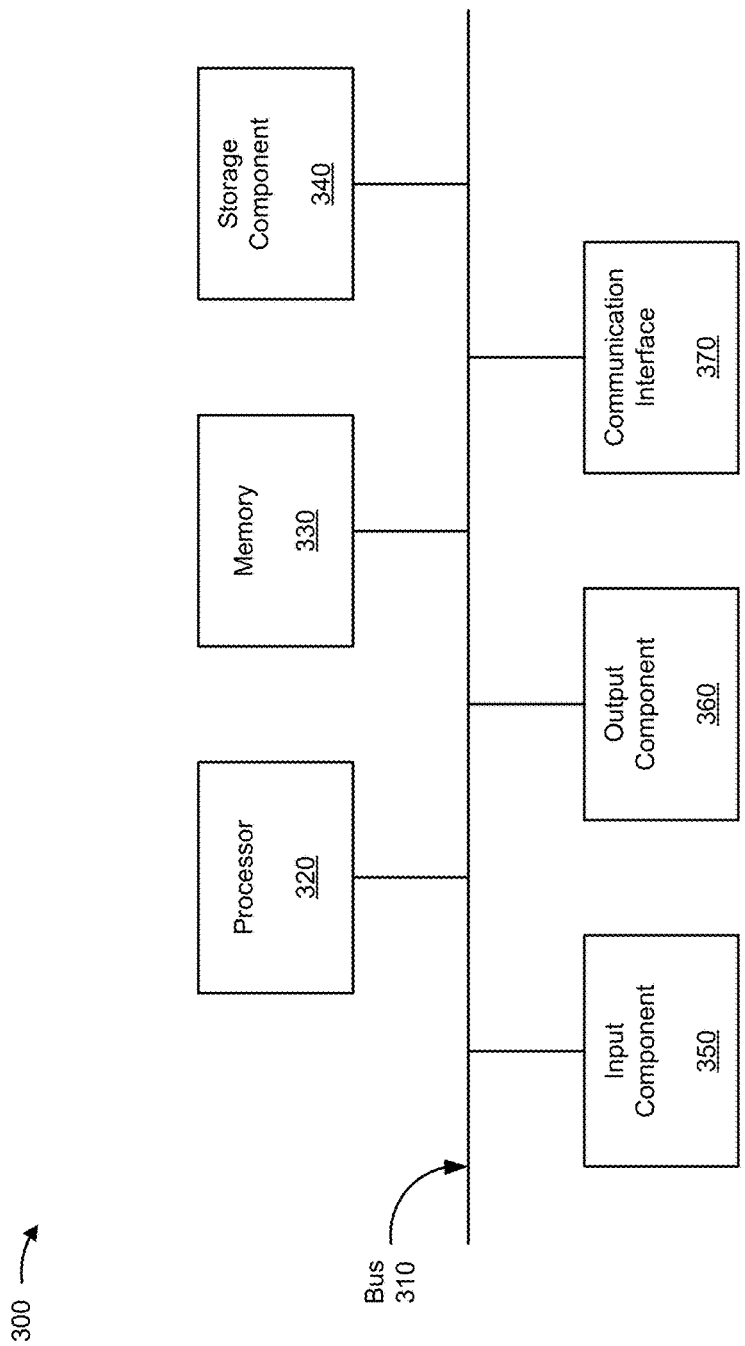
FIG. 3 is a diagram of example components of one or more devices of FIG. 2.

FIG. 3 is a diagram of example components of a device 300. Device 300 may correspond to user device 210, data source device 220, computing resource 235, and/or the like. In some implementations, user device 210, data source device 220, and/or computing resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include an image capture device, such as a camera and/or the like. Additionally, or alternatively, input component 350 may include a sensor for sensing information (e.g., a camera, a global positioning system (GPS) component, an accelerometer, a gyroscope, and/or an actuator). Output component 360 includes a component that provides output information from device 300 (e.g., a display, a speaker, and/or one or more light-emitting diodes (LEDs)). For example, output component 360 may include a light-emitting diode (LED) display, an organic LED (OLED) display, and/or the like.

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
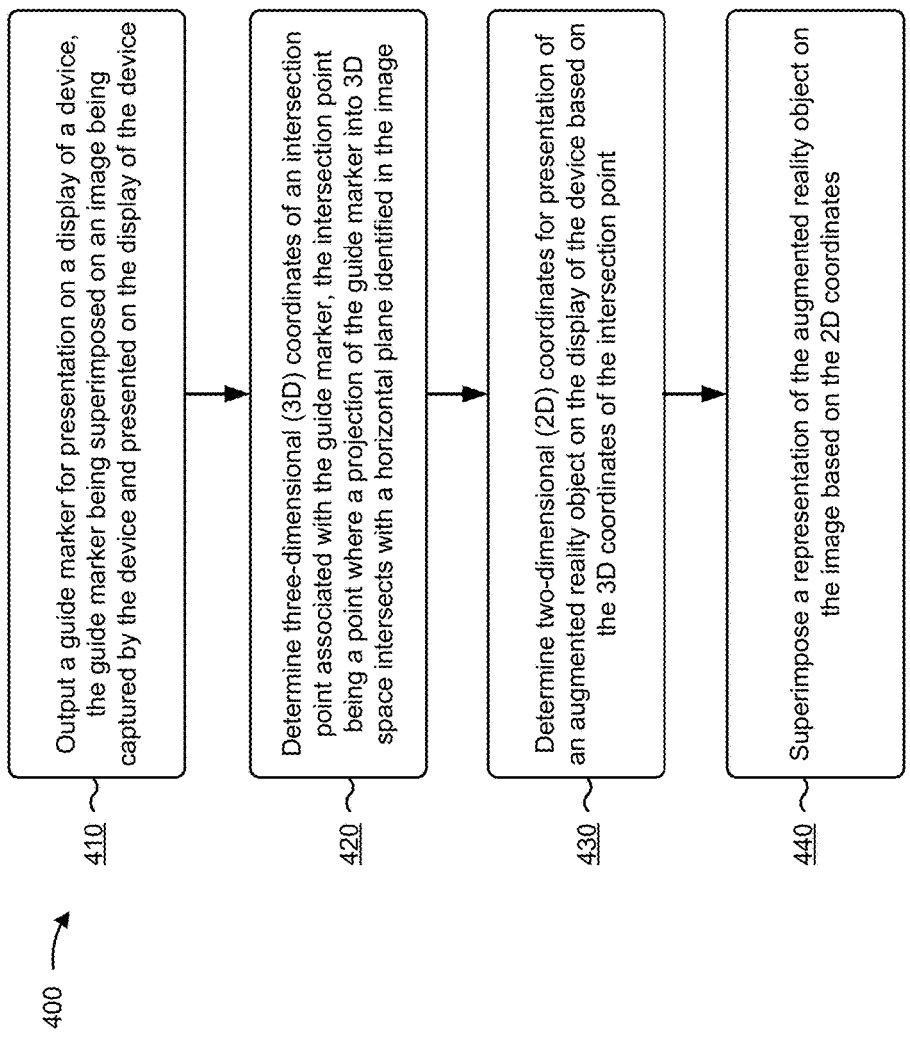
FIG. 4 is a flow chart of an example process for placement of augmented reality object using a guide marker.

FIG. 4 is a flow chart of an example process 400 for placement of augmented reality object using a guide marker. In some implementations, one or more process blocks of FIG. 4 may be performed by user device 210. In some implementations, one or more process blocks of FIG. 4 may be performed by another device or a group of devices separate from or including user device 210, such as data source device 220, augmented reality platform 225, cloud computing environment 230, computing resource 235, and/or the like.

As shown in FIG. 4, process 400 may include outputting a guide marker for presentation on a display of a device, the guide marker being superimposed on an image being captured by the device and presented on the display of the device (block 410). For example, user device 210 may output (e.g., using processor 320, output component 360, and/or the like) a guide marker for presentation on a display of user device 210, as described above in connection with FIGS. 1A and 1B. In some implementations, the guide marker may be superimposed on an image being captured by user device 210 and presented on the display of user device 210.

In some implementations, the guide marker may be a guideline, as described above in connection with FIG. 1A. In some implementations, the guide marker may be a bounding shape, such as a bounding box (e.g., a square, a rectangle, etc.) or another shape (e.g., a circle, an oval, etc.), as described above in connection with FIG. 1B.

In this way, user device 210 may output a guide marker for presentation on a display of user device 210, which may enable user device 210 to determine 3D coordinates of an intersection point associated with the guide marker, as described herein.

As further shown in FIG. 4, process 400 may include determining three-dimensional (3D) coordinates of an intersection point associated with the guide marker, the intersection point being a point where a projection of the guide marker into 3D space intersects with a horizontal plane identified in the image (block 420). For example, user device 210 may determine (e.g., using processor 320 and/or the like) 3D coordinates of an intersection point associated with the guide marker, the intersection point being a point where a projection of the guide marker into 3D space intersects with a horizontal plane identified in the image, as described above in connection with FIGS. 1A and 1B.

In some implementations, user device 210 may determine the 3D coordinates of the intersection point based on an indication that the guide marker is aligned with an intersection of an object in the image and the horizontal plane. In some implementations, the horizontal plane may be designated as a ground plane. For example, user device 210 may designate the horizontal plane as a ground plane by identifying a horizontal plane, determining the size of a horizontal plane, and determining that the size of the horizontal plane satisfies a threshold, which may be done according to one or more techniques described in U.S. patent application Ser. No. 15/850,234, which is hereby incorporated by reference in its entirety.

In this way, user device 210 may determine 3D coordinates of an intersection point associated with the guide marker, which may enable user device 210 to determine 2D coordinates for presentation of an augmented reality object on the display of the device, as described herein.

As further shown in FIG. 4, process 400 may include determining two-dimensional (2D) coordinates for presentation of an augmented reality object on the display of the device based on the 3D coordinates of the intersection point (block 430). For example, user device 210 may determine (e.g., using processor 320 and/or the like) two-dimensional (2D) coordinates for presentation of an augmented reality object on the display of the device based on the 3D coordinates of the intersection point, as described above in connection with FIGS. 1A and 1B.

In some implementations, user device 210 may determine 2D coordinates that represent a position of the guide marker on the display of the device. In this case, user device 210 may determine the 2D coordinates for presentation of the augmented reality object based on the 2D coordinates that represent a position of the guide marker on the display of the device. For example, user device 210 may generate the 2D coordinates for presentation of the augmented reality object by applying an offset to the 2D coordinates that represent the position of the guide marker on the display of the device. In this case, the offset may represent a distance between the augmented reality object and the horizontal plane, may represent a height of a target object in the image, and/or the like.

In some implementations, user device 210 may determine 3D coordinates associated with placement of the augmented reality object based on the 3D coordinates of the intersection point. In this case, user device 210 may determine the 2D coordinates for presentation of the augmented reality object based on the 3D coordinates associated with placement of the augmented reality object.

In some implementations, user device 210 may generate the 3D coordinates associated with placement of the augmented reality object by applying an offset to the 3D coordinates of the intersection point. For example, the offset may represent a distance between the augmented reality object and the horizontal plane, may represent a height of a target object in the image, and/or the like. In some implementations, the height of the target object may be determined by processing the image to determine the height, by performing object recognition to determine the height of the target object, and/or the like.

In some implementations, user device 210 may determine 2D coordinates that represent a position of the guide marker on the display, and may determine 3D coordinates associated with placement of the augmented reality object based on the 3D coordinates of the intersection point. In this case, user device 210 may determine the 2D coordinates for presentation of the augmented reality object based on the 2D coordinates that represent a position of the guide marker on the display and the 3D coordinates associated with placement of the augmented reality object.

In some implementations, user device 210 may determine the 2D coordinates for presentation of the augmented reality object by applying an offset to the 2D coordinates that represent the position of the guide marker on the display. For example, user device 210 may determine the offset based on comparing the 3D coordinates associated with placement of the augmented reality object and the 3D coordinates of the intersection point. In some implementations, the offset may represent a distance between the augmented reality object and the horizontal plane. In some implementations, user device 210 may determine the offset based on a height of an object in the image.

In some implementations, user device 210 may determine the offset based on comparing the 3D coordinates associated with placement of the augmented reality object and the 3D coordinates of the intersection point, based on a distance between the augmented reality object and the horizontal plane, and/or based on a height of an object in the image.

In this way, user device 210 may determine 2D coordinates for presentation of an augmented reality object on the display of the device based on the 3D coordinates of the intersection point, which may enable user device 210 to superimpose a representation of the augmented reality object on the image based on the 2D coordinates, as described herein.

As further shown in FIG. 4, process 400 may include superimposing a representation of the augmented reality object on the image based on the 2D coordinates (block 440). For example, user device 210 may superimpose (e.g., using processor 320, output component 360, and/or the like) a representation of the augmented reality object on the image based on the 2D coordinates, as described above in connection with FIGS. 1A and 1B.

In some implementations, the augmented reality object may be an augmented reality billboard. For example, the augmented reality billboard may include information related to a target object. As a particular example, the target object may be a car on a car lot, and the augmented reality billboard may include information associated with the car, such as make, model, price, etc. As another example, the augmented reality object may be a virtual object in an augmented reality game, in an industrial application, in a broadcast, in a navigation system, in a flight training system, and/or the like.

In some implementations, the user device 210 may superimpose the representation of the augmented reality object on the image based on performing image processing to determine a position for placement of the augmented reality object. For example, the user device 210 may place the augmented reality object in a position that does not block the target object, that does not block one or more other objects, that does not obscure detected text or images, and/or the like. In some implementations, the user device 210 may generate the augmented reality object to have particular size and/or position such that one or more of the above constraints are not violated.

Additionally, or alternatively, the user device 210 may identify an object in the image, and may place the augmented reality object on the object (e.g., a house, a building, a vehicle, a billboard, and/or the like). In some implementations, the user device 210 may prioritize multiple objects in the image, and may superimpose the augmented reality object on a low priority object, and/or may prevent the augmented reality object from being superimposed over a high priority object. Additionally, or alternatively, the user device 210 may determine a transparency level for the augmented reality object based on a priority of an object over which the augmented reality object is being superimposed (e.g., more transparent when placed over a high priority object, less transparent what placed over a low priority object).

Additionally, or alternatively, the user device 210 may determine an orientation of the augmented reality object based on the horizontal plane designated as the ground plane, based on the target object, based on one or more other objects in the image, and/or the like. For example, the user device 210 may orient an edge of the augmented reality object to be parallel to the ground plane, to be perpendicular to the ground plane, and/or the like. Additionally, or alternatively, the user device 210 may determine a size for the augmented reality object based on a size of the detected horizontal plane designated as the ground plane, based on the size of the target object, based on the size of one or more other objects in the image, and/or the like. For example, the user device 210 may generate the augmented reality object to match a size of an object in the image (e.g., a billboard, a side of a building, a side of a vehicle, a sign, and/or the like).

In this way, user device 210 may superimpose a representation of the augmented reality object on the image based on the 2D coordinates, as described above in connection with FIGS. 1A and 1B.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
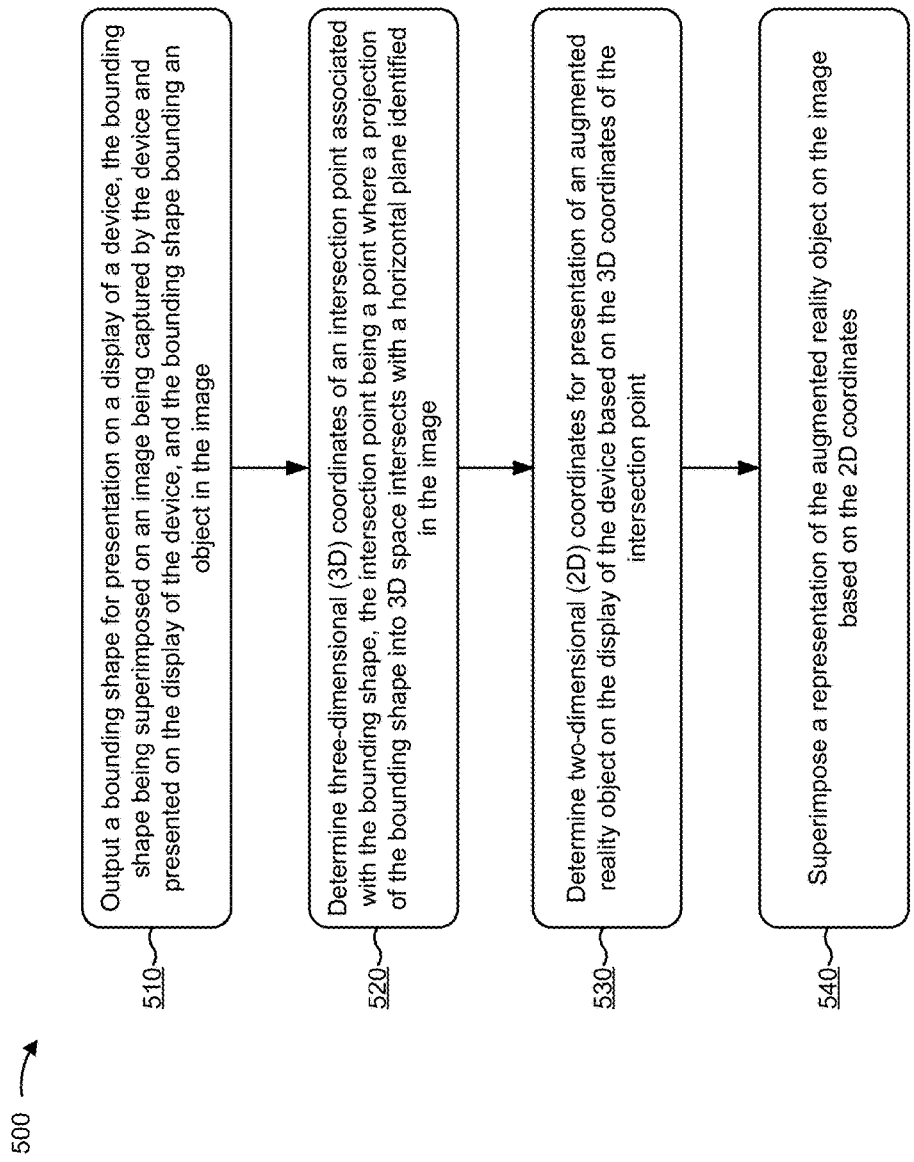
FIG. 5 is a flow chart of another example process for placement of augmented reality object using a guide marker.

FIG. 5 is a flow chart of another example process 500 for placement of augmented reality object using a guide marker. In some implementations, one or more process blocks of FIG. 5 may be performed by user device 210. In some implementations, one or more process blocks of FIG. 5 may be performed by another device or a group of devices separate from or including user device 210, such as data source device 220, augmented reality platform 225, cloud computing environment 230, computing resource 235, and/or the like.

As shown in FIG. 5, process 500 may include outputting a bounding shape for presentation on a display of a device, the bounding shape being superimposed on an image being captured by the device and presented on the display of the device, and the bounding shape bounding an object in the image (block 510). For example, user device 210 may output (e.g., using output component 360 and/or the like) a bounding shape for presentation on a display of a device, the bounding shape bounding an object in the image by being superimposed on an image being captured by the device and presented on the display of the device, as described above in connection with FIGS. 1A and 1B.

In some implementations, the bounding shape may be a bounding box, such as a square, a rectangle, and/or the like. Additionally, or alternatively, the bounding shape may be another shape, such as a circle, an oval, and/or the like. In some implementations, user device 210 may modify, adjust, etc. the shape. For example, user device 210 may apply object recognition to change a size of the bounding shape to bound or surround the object. In some implementations, the bounding shape may be user configurable. For example, user device 210 may provide a user interface by which the user can select a shape, draw a boundary around the object, and/or the like.

In this way, user device 210 may output a bounding shape for presentation on a display of a device, the bounding shape being superimposed on an image being captured by the device and presented on the display of the device, and the bounding shape bounding an object in the image, which may enable user device 210 to determine 3D coordinates of an intersection point associated with the bounding shape, a described herein.

As further shown in FIG. 5, process 500 may include determining three-dimensional (3D) coordinates of an intersection point associated with the bounding shape, the intersection point being a point where a projection of the bounding shape into 3D space intersects with a horizontal plane identified in the image (block 520). For example, user device 210 may determine (e.g., using processor 320 and/or the like) three-dimensional (3D) coordinates of an intersection point associated with the bounding shape, the intersection point being a point where a projection of the bounding shape into 3D space intersects with a horizontal plane identified in the image, as described above in connection with FIGS. 1A and 1B.

In some implementations, user device 210 may determine the 3D coordinates of the intersection point based on an indication that the bounding shape is bounding the object. In some implementations, the intersection point may be a point where a projection of a lower boundary, of the bounding shape, into 3D space intersects with the horizontal plane identified in the image.

In some implementations, user device 210 may designate the horizontal plane as a ground plane. For example, user device 210 may designate the horizontal plane as a ground plane by identifying a horizontal plane, determining the size of a horizontal plane, and determining that the size of the horizontal plane satisfies a threshold. For example, the user device 210 may designate a horizontal plane as a ground plane according to one or more techniques described in U.S. patent application Ser. No. 15/850,234, which is hereby incorporated by reference in its entirety.

In this way, user device 210 may determine 3D coordinates of an intersection point associated with the bounding shape, which may enable user device 210 to determine 2D coordinates for presentation of an augmented reality object on the display of the device based on the 3D coordinates of the intersection point, as described herein.

As further shown in FIG. 5, process 500 may include determining two-dimensional (2D) coordinates for presentation of an augmented reality object on the display of the device based on the 3D coordinates of the intersection point (block 530). For example, user device 210 may determine (e.g., using processor 320 and/or the like) two-dimensional (2D) coordinates for presentation of an augmented reality object on the display of the device based on the 3D coordinates of the intersection point, as described above in connection with FIGS. 1A and 1B.

In some implementations, user device 210 may determine 2D coordinates that represent a position of a lower point of the bounding shape on the display and that correspond to the 3D coordinates of the intersection point, and may determine 3D coordinates associated with placement of the augmented reality object based on the 3D coordinates of the intersection point. In this case, user device 210 may determine the 2D coordinates for presentation of the augmented reality object based on the 2D coordinates that represent a position of the lower point of the bounding shape and the 3D coordinates associated with placement of the augmented reality object.

In some implementations, user device 210 may determine the 2D coordinates for presentation of the augmented reality object based on an offset. In some implementations, user device 210 may determine the offset based on a height of the bounding shape, and/or based on a height of the object. In some implementations, user device 210 may determine the 2D coordinates for presentation of the augmented reality object based on a height of the bounding shape.

In some implementations, user device 210 may determine 2D coordinates that represent a position of a lower point of the bounding shape on the display of the device. In this case, user device 210 may determine the 2D coordinates for presentation of the augmented reality object based on the 2D coordinates that represent a position of the lower point of the bounding shape on the display of the device.

In some implementations, user device 210 may generate the 2D coordinates for presentation of the augmented reality object by applying an offset to the 2D coordinates that represent the position of the lower point of the bounding shape on the display of the device. For example, the offset may be a height of the bounding shape.

In some implementations, user device 210 may determine 3D coordinates associated with placement of the augmented reality object based on the 3D coordinates of the intersection point. In this case, user device 210 may determine the 2D coordinates for presentation of the augmented reality object based on the 3D coordinates associated with placement of the augmented reality object.

In some implementations, user device 210 may generate the 3D coordinates associated with placement of the augmented reality object by applying an offset to the 3D coordinates of the intersection point. For example, user device 210 may determine the offset based on a height of the object. In this case, user device 210 may determine the offset based on a height of the bounding shape.

In this way, user device 210 may determine 2D coordinates for presentation of an augmented reality object on the display of the device based on the 3D coordinates of the intersection point, which may enable user device 210 to superimpose a representation of the augmented reality object on the image based on the 2D coordinates, as described herein.

As further shown in FIG. 5, process 500 may include superimposing a representation of the augmented reality object on the image based on the 2D coordinates (block 540). For example, user device 210 may superimpose (e.g., using processor 320, output component 360 and/or the like) a representation of the augmented reality object on the image based on the 2D coordinates, as described above in connection with FIGS. 1A and 1B.

In some implementations, the augmented reality object may be an augmented reality billboard, as described above in connection with FIG. 4. In some implementations, the augmented reality object may be a virtual object in an augmented reality game, in an industrial application, in a broadcast, in a navigation system, in a flight training system, and/or the like.

In some implementations, the user device 210 may superimpose the representation of the augmented reality object on the image based on performing image processing to determine a position for placement of the augmented reality object, a size of the augmented reality object, a transparency level of the augmented reality object, an orientation of the augmented reality object, and/or the like, as described above in connection with FIG. 4.

In this way, user device 210 may superimpose a representation of the augmented reality object on the image based on the 2D coordinates.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

User device 210 may display a guide marker (e.g., a guideline, a bounding shape, etc.) such that a user can align a target object with the guide marker (e.g., by pointing a smartphone camera at the target object until the target object aligns with the guide marker) and using the alignment to determine coordinates for superimposing the augmented reality object on the image. For example, user device 210 may display a guide marker, where the guide marker is superimposed on an image being captured by user device 210 and presented on the display user device 210, and may determine 3D coordinates of an intersection point where a projection of the guide marker into 3D space intersects with a horizontal plane identified in the image. Based on the 3D coordinates of the intersection point, user device 210 may determine two-dimensional (2D) coordinates for presentation of an augmented reality object on the display of user device 210, and may superimpose a representation of the augmented reality object on the image based on the 2D coordinates.

In this way, user device 210 provides for effective and accurate placement of augmented reality objects in an image displayed by a user device (e.g., a smartphone). For example, user device 210 provides for automatic placement of an augmented reality object a particular distance above a target object, thereby ensuring and/or enhancing the usefulness of the augmented reality object to the user, and obviating manual and/or further attempts to position user device 210 to accomplish a desired result, thereby conserving processing resources, power (e.g., battery life), and/or the like of user device 210.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A system, comprising: a camera; a display; one or more memories; and one or more processors, communicatively coupled to the one or more memories, to: output a guide marker for presentation on the display, the guide marker being superimposed on an image being captured by the camera and presented on the display, the guide marker being output on the display to allow a user to position the guide marker at a base of a target object within the image; determine two-dimensional (2D) coordinates of an intersection point associated with the guide marker on the display; determine three-dimensional (3D) coordinates of the intersection point associated with the guide marker, the intersection point being a point where a projection of the guide marker into 3D space intersects with a horizontal plane identified in the image; determine 3D coordinates associated with placement of an augmented reality object based on the 3D coordinates of the intersection point; determine 2D coordinates for presentation of the augmented reality object on the display based on at least two or more of: the 2D coordinates that represent the intersection point associated with the guide marker on the display, the 3D coordinates associated with placement of the augmented reality object, or the 3D coordinates of the intersection point; and superimpose a representation of the augmented reality object on the image based on the 2D coordinates for presentation of the augmented reality object on the display.

2. The system of claim 1, where the 2D coordinates for presentation of the augmented reality object are determined by applying an offset to the 2D coordinates that represent the position of the guide marker on the display.

3. The system of claim 2, where the offset is determined based on comparing the 3D coordinates associated with placement of the augmented reality object and the 3D coordinates of the intersection point.

4. The system of claim 2, where the offset represents a distance between the augmented reality object and the horizontal plane.

5. The system of claim 2, where the offset is determined based on a height of the target object in the image.

6. The system of claim 1, where the one or more processors are further to: determine the 3D coordinates of the intersection point based on an indication that the guide marker is aligned with an intersection of the target object in the image and the horizontal plane.

7. The system of claim 1, where the horizontal plane is designated as a ground plane.

8. The system of claim 1, where the one or more processors are further to: determine a size for the augmented reality object based on a size of the target object.

9. A method, comprising: outputting, by a device, a guide marker for presentation on a display of the device, the guide marker being superimposed on an image being captured by the device and presented on the display of the device, the guide marker being output on the display to allow a user to position the guide marker at a base of a target object within the image; determining, by the device, two-dimensional (2D) coordinates of an intersection point associated with the guide marker on the display; determining, by the device, three-dimensional (3D) coordinates of the intersection point associated with the guide marker, the intersection point being a point where a projection of the guide marker into 3D space intersects with a horizontal plane identified in the image; determining, by the device, 3D coordinates associated with placement of an augmented reality object based on the 3D coordinates of the intersection point; determining, by the device, 2D coordinates for presentation of the augmented reality object on the display of the device based on at least two or more of: the 2D coordinates that represent the intersection point associated with the guide marker on the display, the 3D coordinates associated with placement of the augmented reality object, or the 3D coordinates of the intersection point; and superimposing, by the device, a representation of the augmented reality object on the image based on the 2D coordinates for presentation of the augmented reality object on the display.

10. The method of claim 9, where the 2D coordinates for presentation of the augmented reality object are generated by applying an offset to the 2D coordinates that represent the position of the guide marker on the display of the device.

11. The method of claim 10, where the offset represents at least one of: a distance between the augmented reality object and the horizontal plane, or a height of the target object in the image.

12. The method of claim 9, where the 3D coordinates associated with placement of the augmented reality object are generated by applying an offset to the 3D coordinates of the intersection point.

13. The method of claim 12, where the offset represents at least one of: a distance between the augmented reality object and the horizontal plane, or a height of the target object in the image.

14. The method of claim 9, where the horizontal plane is designated as a ground plane.

15. The method of claim 9, further comprising: determining a size for the augmented reality object based on a size of the target object.

16. A non-transitory computer-readable medium storing instructions, the instructions comprising: one or more instructions that, when executed by one or more processors of a device, cause the one or more processors to: output a guide marker for presentation on a display of the device, the guide marker being superimposed on an image being captured by the device and presented on the display, the guide marker being output on the display to allow a user to position the guide marker at a base of a target object within the image; determine two-dimensional (2D) coordinates of an intersection point associated with the guide marker on the display; determine three-dimensional (3D) coordinates of the intersection point associated with the guide marker, the intersection point being a point where a projection of at least a portion of the guide marker into 3D space intersects with a horizontal plane identified in the image; determine 3D coordinates associated with placement of an augmented reality object based on the 3D coordinates of the intersection point; determine 2D coordinates for presentation of the augmented reality object on the display based on at least two or more of: the 2D coordinates that represent the intersection point associated with the guide marker on the display, the 3D coordinates associated with placement of the augmented reality object, or the 3D coordinates of the intersection point; and superimpose a representation of the augmented reality object on the image based on the 2D coordinates for presentation of the augmented reality object on the display.

17. The non-transitory computer-readable medium of claim 16, where the 2D coordinates for presentation of the augmented reality object are determined by applying an offset to the 2D coordinates that represent the position of the guide marker on the display.

18. The non-transitory computer-readable medium of claim 17, where the offset is determined based on at least one of: comparing the 3D coordinates associated with placement of the augmented reality object and the 3D coordinates of the intersection point, a distance between the augmented reality object and the horizontal plane, or a height of the target object in the image.

19. The non-transitory computer-readable medium of claim 17, where the offset represents at least one of: a distance between the augmented reality object and the horizontal plane, or a height of the target object in the image.

20. The non-transitory computer-readable medium of claim 16, where the horizontal plane is designated as a ground plane.

* * * * *